United States Patent Office 3,101,527
Patented Aug. 27, 1963

3,101,527
FRICTION MATERIAL
Eric W. Weinman, Birmingham, and Adolph M. Ryniak, Hazel Park, Mich., assignors to General Motors Corporation, Detroit, Mich., a corporation of Delaware
No Drawing. Filed Sept. 2, 1960, Ser. No. 53,605
7 Claims. (Cl. 29—182.5)

This invention relates to friction materials and is particularly concerned with ferrous friction materials for use with clutches, brakes and the like.

An object of the invention is to provide a friction facing consisting essentially of iron, graphite and an aluminum-iron alloy in controlled quantities for raising the coefficient of friction of the material at low temperatures.

In carrying out the above object it is a further object of the invention to form a friction element from a sintered mixture of iron powder with graphite wherein graphite ranges between 20% and 30% by weight of the element together with small quantities of a lubricant material in the form of bismuth or bismuth alloys together with an iron-aluminum alloy addition for improving frictional qualities of the sintered material.

A still further object of the invention is to provide a ferrous friction member as set forth in the preceding object wherein the iron-aluminum alloy addition is such that the aluminum content ultimately ranges from 2.2% to 22.5% by weight of the element.

In carrying out the above object it is a still further object of the invention to utilize an alloy of iron and aluminum for making the aluminum addition wherein the aluminum content of said alloy ranges from 30% to 70% by weight of the alloy and wherein a 50-50 mixture is preferred.

A still further object of the invention is to provide a sintered friction element comprising a mixture of iron in quantities of about 67 parts, graphite 30 parts, bismuth lead alloy (50-50) 10 parts, copper 5 parts, together with up to 1% by weight of friction enhancing materials taken from the class consisting of sulphur and mullite together with from 4.4% to 45% by weight of the mixture of a 50-50 iron-aluminum alloy.

Further objects and advantages of the present invention will be apparent, reference being had to the following description.

Friction materials formed from sintered ferrous material have met with considerable success in the automotive field wherein brakes have been formed from such materials which are capable of operating at high speeds and which yield excellent frictional characteristics over the major portion of the operational range. One of the undesirable factors found in metallic brakes of the sintered ferrous type is directed to a lower coefficient of friction when the brake is cold, than after the brake has assumed an elevated operating temperature. This condition is termed in the trade as "cold pedal." "Cold pedal" is not only undesirable but may be dangerous if the vehicle is driven at high speed prior to initial braking since when the brakes are applied greater pressure is required and since the coefficient of friction is lower at the low end of the temperature range a greater distance is required to bring the vehicle to a stop.

The present invention is directed to an addition agent for use with the ferrous friction materials including graphite wherein the initial coefficient of friction is raised and, in fact, wherein the coefficient of friction over the entire range of temperatures is translated to a higher range of figures. This means that while the material used in the brake lining has a lower coefficient of friction at low ambient temperatures this coefficient is nevertheless greatly improved over the coefficient of friction of the same material without the specific addition agent set forth herein.

In copending application S.N. 776,978, now Patent No. 2,945,292, issued July 19, 1960, assigned to the assignee of the present invention, a friction material of the type adapted for use with the present addition agent is set forth. This friction material contains a major portion of iron and a substantial percentage of graphite ranging from 20% to 30% by weight and also contains a lubricant material comprising bismuth or bismuth alloy which greatly improves the frictional characteristics. Also, small percentages of sulphur, mullite or both may be incorporated to enhance the frictional qualities of the material. This particular material has the good frictional characteristics although at low ambient temperatures the "cold pedal" condition exists. Thus, with the temperature at 70° F. and below, considerably greater pedal pressure is required to cause a vehicle to come to a stop from any given speed than at higher temperatures.

The present invention is specifically directed to an addition agent for friction material as disclosed in application S.N. 776,978 wherein an addition agent comprising an iron-aluminum alloy is utilized. This addition agent when added to the friction material mix prior to the sintering thereof greatly improves the "cold pedal" condition of the brake by raising the initial coefficient of friction of the material. In fact, the addition agent translates the entire coefficient of friction curve over the operational range of temperatures upwardly for improving the over all operating characteristics of the friction material.

We have found that iron and aluminum should be in the alloyed condition as the addition agent to obtain the desired results since the addition of elemental aluminum to the powdered metal mix is not desirable since it results in greater wear of the brake lining. When controlled quantities of iron-aluminum alloy are added to the mix the improved characteristics are immediately apparent. The reasons for this improvement are not entirely apparent although it is believed the addition creates an abrasive film which raises the coefficient of friction upon initial application of the brake. Specifically, we prefer to use a 50-50 alloy, however, the aluminum may vary from 30% to 70% of the alloy without greatly changing the usefulness of the addition agent.

The quantity of addition agent added to the mix may also vary. We have found that the aluminum content of the mix may be as low as 2.2% by weight or as high as 22.5%. Hence the addition agent depending upon its aluminum content may be varied to provide this range of aluminum in the final mix. Quantities over this figure do not appear to improve the operational characteristics and, in fact, the coefficient of friction will begin to decrease when greater quantities are added. Furthermore, it is also apparent that additions not in excess of 4.5% of aluminum are preferable since it will be seen from the figures that follow that as the quantity of the addition agent increases there is a tendency for the coefficient of friction to drop off at the high end of the temperature range which results in what is known as "fading." From the figures it will be seen that additions between 2.2% and 4.5% of aluminum in an iron-aluminum alloy are preferable and that improved qualities are apparent in each instance. Greater quantities improve "cold pedal" but these greater quantities of addition agents likewise begin to effect a slight lowering of the coefficient of friction at the higher temperatures.

The following figures are average coefficient of friction figures taken over a number of runs of various brake materials with and without the addition agent wherein the addition agent varies in quantities added. In the chart to follow the base material is a sintered mixture of 67 parts 250 mesh sponge iron powder (combined sulphur up to 1% by weight) 30 parts graphite (15 parts artificial graphite density 1.85 grams per cc., minus 325 mesh and 15 parts coarse flakes material graphite, density about 2.1 grams per cc., 20 to 30 mesh) 8 parts 150 mesh copper powder, 10 parts 100 mesh bismuth-lead (50–50) powder. The other examples are the same material which has added thereto in the specific percentages noted of aluminum in the form of a 50–50 iron-aluminum alloy. In all instances the intimately mixed ingredients were briquetted to 6,000 pounds per square inch and were sintered for about 40 minutes under non-oxidizing conditions at about 1800° F.

| Temperature | 70° | 200° | 800–900° |
| --- | --- | --- | --- |
|  | C/F | C/F | C/F |
| Base Material | .208 | .306 | .316 |
| W/2.2% Al | .262 | .347 | .355 |
| W/4.5% Al | .272 | .363 | .369 |
| W/9% Al | .285 | .365 | .361 |
| W/22.5% Al | .289 | .357 | .230 |

From these figures it is apparent that the aluminum addition in quantities ranging from 2.2% to 22.5% by weight increased the coefficient of friction of the base material in every instance at 70° F. and generally improved the coefficient of friction over the entire range. In this connection 70° was taken as an ambient temperature whereas 800° to 900° F. was taken as an average maximum operating temperature. It is quite apparent that the addition agent greatly improves the over all operation of the brake which includes the specific linings set forth.

Similar figures were obtained using various alloys of iron and aluminum as set forth above wherein the aluminum ranges from 30% to 70% by weight of the alloy. In each and every instance the initial coefficient of friction was translated generally upwardly from the material without the addition agent.

While this disclosure has been directed to additives of iron-aluminum alloy to specific ferrous friction materials it is to be understood that the invention, in its broad aspects, may be applied to any type of sintered ferrous friction material containing graphite. In this connection graphite is a necessary addition to prevent galling, improve smoothness and reduce noise and linings having less than 10% graphite by weight are not satisfactory. However, all of said linings exhibit "cold pedal" problems. In each case the addition of the iron-aluminum alloy within the ranges set forth will improve the condition and make the lining more effective at low ambient temperatures. Therefore, while the specific material as set forth in S.N. 776,978 is a preferred material it is not a necessary limitation to the broad invention set forth herein which is directed to iron-aluminum additives within specific limits to sintered ferrous friction materials including a minimum of 10% by weight of graphite.

While the embodiments of the present invention as herein disclosed, constitute preferred forms, it is to be understood that other forms might be adopted.

What is claimed is as follows:

1. A lining comprising a compacted and sintered friction material wherein the basic ingredients consist essentially of iron in quantities of at least 50% by weight and graphite in quantities of 10% and above by weight of the friction material, together with an addition agent in quantities sufficient to supply from 2.2% to 22.5% of aluminum by weight of the friction material and consisting of an iron-aluminum alloy wherein aluminum varies from 30% to 70% by weight of the alloy with iron making up the remainder.

2. A lining comprising a compacted and sintered friction material wherein the basic ingredients consist essentially of iron in quantities of at least 50% by weight and graphite in quantities of 10% and above by weight of the friction material, together with an addition agent in quantities sufficient to supply from 2.2% to 4.5% of aluminum by weight of the friction material and consisting of an iron-aluminum alloy wherein aluminum varies from 30% to 70% by weight of the alloy with iron making up the remainder.

3. A lining comprising a compacted and sintered friction material wherein the basic ingredients consist essentially of iron in quantities of at least 50% by weight and graphite in quantities of 10% and above by weight of the friction material, together with an addition agent in quantities sufficient to supply from 2.2% to 4.5% of aluminum by weight of the friction material and consisting of a 50% iron, 50% aluminum alloy by weight.

4. A lining comprising a compacted and sintered friction material wherein the basic ingredients consist essentially of iron in quantities of at least 50% by weight and graphite in quantities of 20% to 30% by weight of the friction material, together with an addition agent in quantities sufficient to supply from 2.2% to 4.5% of aluminum by weight of the friction material and consisting of an iron-aluminum alloy wherein aluminum varies from 30% to 70% by weight of the alloy with iron making up the remainder.

5. A lining comprising a compacted and sintered friction material wherein the basic ingredients consist essentially of iron in quantities of at least 50% by weight and graphite in quantities of about 20% to 30% by weight of the friction material, together with an addition agent in quantities sufficient to supply from 2.2% to 22.5% of aluminum by weight of the friction material and consisting of an iron-aluminum alloy wherein aluminum varies from 30% to 70% by weight of the alloy with iron making up the remainder.

6. A lining comprising a compacted and sintered friction material wherein the basic ingredients consist essentially of iron in quantities of at least 50% by weight and graphite in quantities of 20% to 30% by weight of the friction material, together with an addition agent in quantities sufficient to supply from 2.2% to 22.5% of aluminum by weight of the friction material and consisting of a 50% iron, 50% aluminum alloy by weight.

7. A lining comprising a compacted and sintered friction material wherein the basic ingredients consist essentially of iron in quantities of at least 50% by weight and graphite in quantities of 20% to 30% by weight of material, together with an addition agent in quantities sufficient to supply 2.2% to 4.5% of aluminum by weight of the material mixed used to form said friction material and wherein said addition agent consists of a 50% iron, 50% aluminum alloy by weight.

References Cited in the file of this patent

UNITED STATES PATENTS

| 2,863,211 | Wellman | Dec. 9, 1958 |
| 2,884,687 | Thomson | May 5, 1959 |
| 2,945,292 | Luther et al. | July 19, 1960 |

OTHER REFERENCES

Goetzel: "Treatise on Powder Metallurgy," vol. 2, 1950, page 626.